United States Patent

Goloff et al.

[11] 3,961,404
[45] June 8, 1976

[54] METHOD FOR MACHINING A GROOVE IN A METAL SURFACE

[75] Inventors: Alexander Goloff, East Peoria; Hiram Allen Brubaker, Peoria, both of Ill.

[73] Assignee: Caterpillar Tractor Co., Peoria, Ill.

[22] Filed: May 1, 1975

[21] Appl. No.: 573,680

[52] U.S. Cl. .............................. 29/156.5 R; 29/90 R; 29/95.1; 29/567; 408/54; 90/64
[51] Int. Cl.² ........................................ B23P 15/10
[58] Field of Search .................. 29/95.1, 90 R, 567, 29/156.4 R, 156.5 R; 408/54; 51/DIG. 32; 90/30–32, 24.3, 64

[56] References Cited
UNITED STATES PATENTS

| | | | |
|---|---|---|---|
| 1,000,888 | 8/1911 | Beche | 29/95.1 |
| 2,242,036 | 5/1941 | La Pointe | 29/95.1 |
| 2,312,929 | 3/1943 | Phaneuf | 29/95.1 |
| 3,771,894 | 11/1973 | Happy | 408/54 |
| 3,851,992 | 12/1974 | Sawada et al. | 90/31 X |
| 3,872,561 | 3/1975 | Pomernacki | 29/95.1 |

*Primary Examiner*—Leonidas Vlachos
*Attorney, Agent, or Firm*—Wegner, Stellman, McCord, Wiles & Wood

[57] ABSTRACT

A method of forming a groove in an essentially planar face of a metal object, the groove being uniformly curved on an arc of radius "$r$", and being of a width "$w$" and a constant depth "$d$". Such grooves must be formed, for example, to receive the end face seals of the piston of a rotary engine of the trochoidal type. The groove is cut with a broach which is uniformly curved on an arc of said radius "$r$", by producing relative motion of the broach and the object about an axis which is the center of a circle of said radius "$r$", in such manner that the teeth of the broach cut the groove.

6 Claims, 7 Drawing Figures

U.S. Patent  June 8, 1976  3,961,404
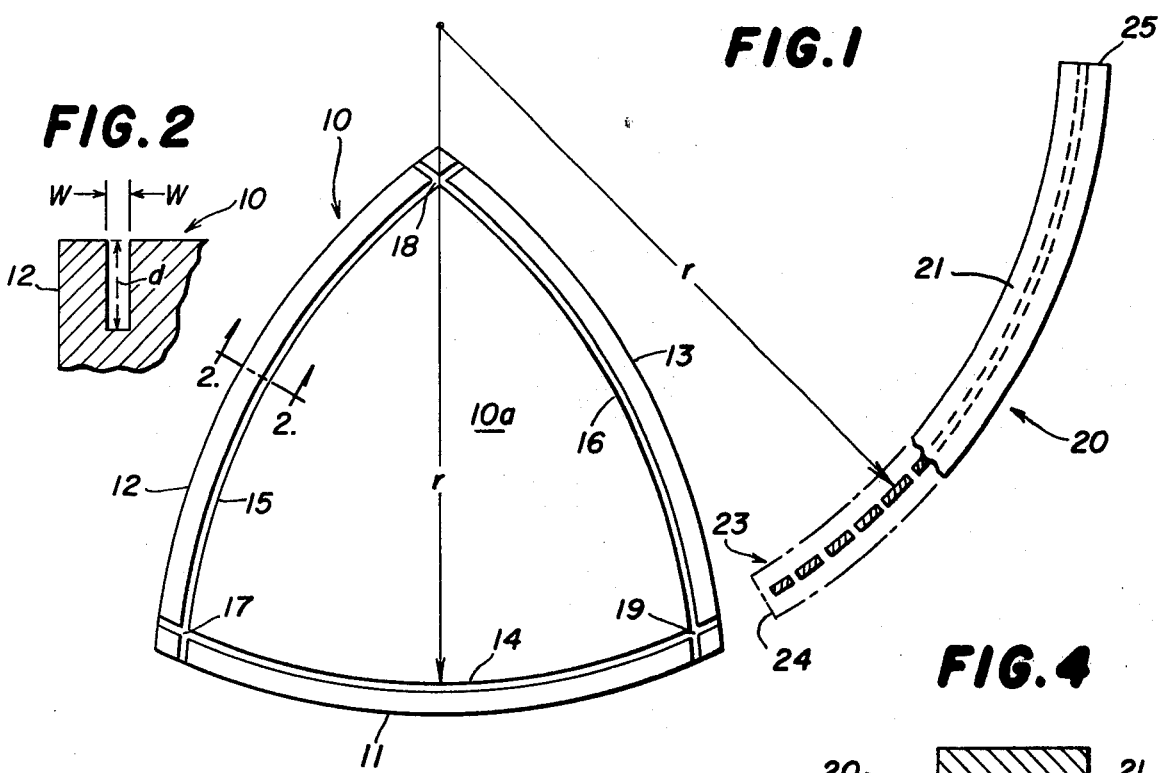
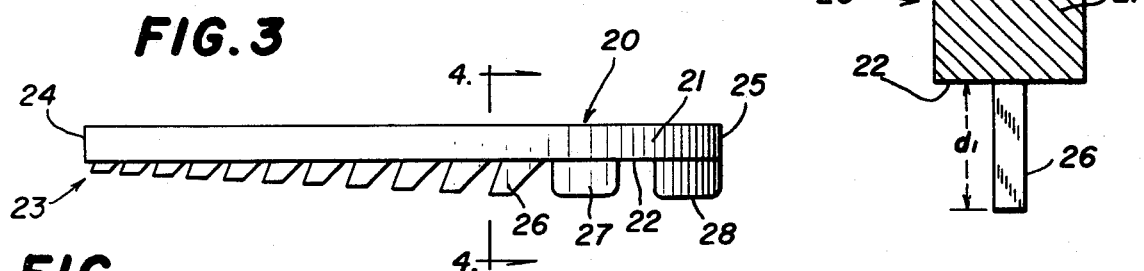
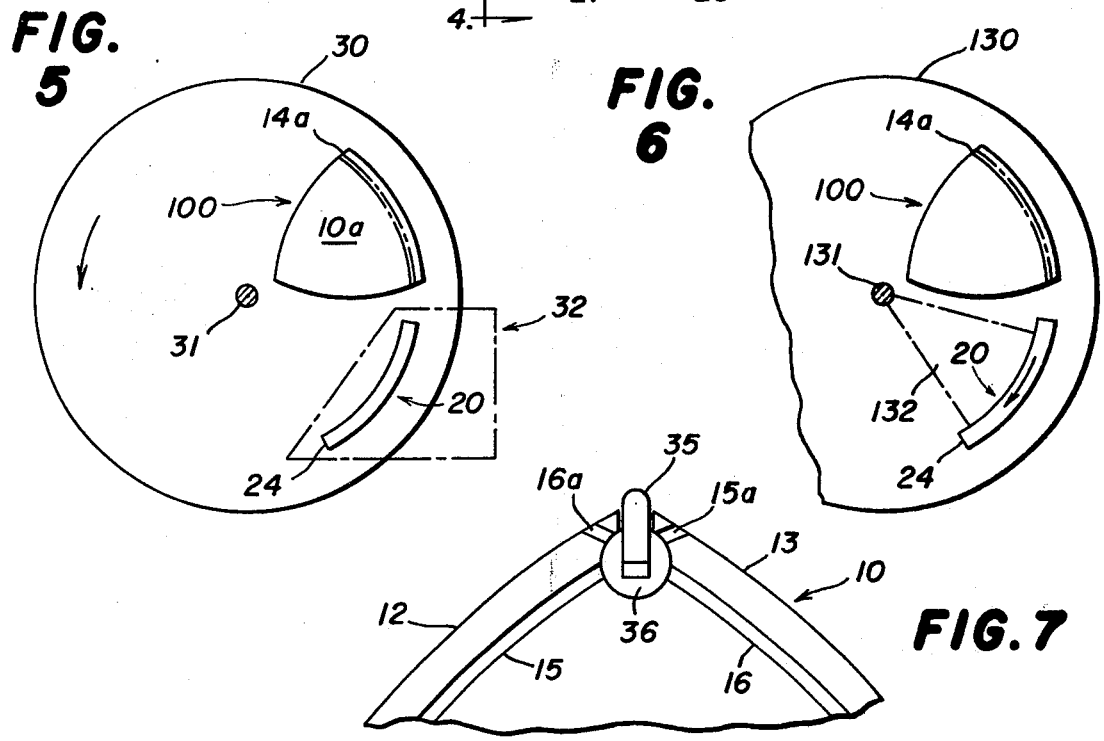

METHOD FOR MACHINING A GROOVE IN A METAL SURFACE

BACKGROUND OF THE INVENTION

The pistons of rotary internal combustion engines of the trochoidal type, commonly known as Wankel engines, must have grooves cut in their planar end faces to receive the end face seals by means of which the pistons are sealed relative to the cavities in which they rotate. The shape of such grooves makes them very difficult to machine. Such grooves are uniformly curved from end to end as an arc of a circle, and they are very narrow and deep, commonly having a depth to width ratio in the neighborhood of four to one. Typically, such grooves are 0.04 inch wide by 0.16 inch deep.

Heretofore, the common practice has been to machine the grooves by means of a miniature end mill which may be no larger in diameter than the groove width. Tool life is short, machining time is uneconomically long, and the miniature end mill often produces an inadequate finish on the sides of the grooves which makes sealing difficult and tends to permit undesirable gas leakage.

An alternative method is described in U.S. Pat. No. 3,799,706, in which the rotor is made in two parts which are spaced to define the two sides of each groove. It is difficult to provide a good piston finish; and in addition the parts must be press fitted and it is expensive to do so because of the peculiar shape of the piston.

SUMMARY OF THE INVENTION

In accordance with the present invention, the seal grooves are cut by means of a broach which is curved from end to end so that it forms an arc of a circle of the same radius as that of the seal grooves. Except for its arcuate shape, the broach is conventional. It has a series of cutting teeth which are progressively longer from the leading end of the broach to its trailing end, with all the teeth being of a width "$w$" which is equal to the width of the grooves to be cut, and with the last cutting tooth in the series being of a length "$dl$" which is a predetermined amount greater than the depth of the grooves to be cut. Trailing the last cutting tooth are one or more burnishing teeth of a length at least equal to "$dl$".

The piston is positioned so that the planar face in which a groove is to be cut is perpendicular to an axis, and assuming the groove is of an arc of radius "$r$" the line of the groove is located as an arc of a circle struck about said axis. The broach is positioned so that it occupies an arc of the circle, and relative motion is then produced between the piston and the broach about the axis so that the broach teeth cut the necessary arcuate groove. This may be done, of course, either by securing the piston in a fixture and moving the broach endwise or by fixing the broach in a fixture and moving the piston.

Such a piston has three arcuate seal grooves cut parallel to the arcuate faces of its three circumferential surfaces, and the usual apex seal and apex seal bolt are then installed. Because the grooves in accordance with the present method are formed by means of a broach, each groove extends to the two adjacent arcuate faces of the piston. If desired, the short empty groove portions outside the apex seals may be plugged in any desired manner.

While the present method is of the greatest interest in forming the endseal grooves for the pistons of rotary engines of the trochoidal type, it is equally useful in machining any grooves which are formed in essentially planar surfaces of metal objects and which are uniformly curved from end to end.

THE DRAWINGS

FIG. 1 is a plan view of a trochoidal engine piston with the seal grooves cut therein and with a broach for practicing the present invention in the position that it occupies before cutting a groove, the leading end portion of the base of the broach being broken away to show the teeth;

FIG. 2 is a fragmentary sectional view on an enlarged scale taken substantially as indicated along the line 2—2 of FIG. 1;

FIG. 3 is a side elevational view of the broach;

FIG. 4 is a sectional view on an enlarged scale taken substantially as indicated along the line 4—4 of FIG. 3;

FIG. 5 is a schematic plan diagram of an arrangement for cutting a groove in which the broach is mounted in a stationary tool holder and the work piece is moved about an axis;

FIG. 6 is a fragmentary view similar to FIG. 5 but illustrating a system in which the workpiece is stationary and the tool holder is rotated; and FIG. 7 is a fragmentary view on an enlarged scale which shows the intersection of two grooves with the apex seal and apex seal fastener in place.

DETAILED DESCRIPTION OF THE INVENTION

A rotary engine piston, indicated generally at 10, has three arcuate circumferential faces 11, 12 and 13, and parallel to those faces are respective seal grooves 14, 15 and 16. All of the grooves are identical, and as illustrated in FIG. 2 they are of a width $w$ and a depth $d$. The depth is about four times the width, and typically the width may be 0.04 inch and the depth 0.16 inch. Each of the grooves is uniformly curved as an arc of a circle of radius $r$. The grooves 14 and 15 intersect at an apex 17; the grooves 15 and 16 intersect at an apex 18; and the grooves 14 and 16 intersect at an apex 19. All three grooves are formed in a planar side face 10a of the piston 10.

A broach, indicated generally at 20, includes a base 21 which has a planar surface 22, and there is a series 23 of teeth perpendicular to the planar surface 22. The broach 20 has a leading end 24 and a trailing end 25, and as seen in FIG. 3 the teeth of the series 23 are progressively longer from the leading end 24 to the trailing end 25, with the last tooth 26 of the series being of a length $dl$ which is a predetermined amount greater than the depth $d$ of each of the grooves. Following the series 23 of cutting teeth is a pair of burnishing teeth 27 and 28 which are the same length as the last cutting tooth 26. As seen in FIG. 1, the broach 20 is formed as an arc of a circle the radius $r$ of which is equal to the radius of curvature $r$ of each of the grooves 14, 15 and 16.

In order to cut a groove such as the groove 14, a piston, indicated generally at 100 may be moved relative to a stationary tool holder 20 as illustrated in FIG. 5, or the piston 100 may be held in a fixed position while the tool holder is moved in the necessary path to cut the groove. As seen in FIG. 5, a machine table 30 is rotatable about an axis 31, and the piston 100 is locked onto the machine table by any suitable means so that the line 14a along which the groove 14 is to be cut is positioned as an arc of a circle of radius r with respect to the machine table axis 31. A stationary tool holder 32 positions the broach 20 so that it, too, occupies an arc of a circle of radius r with reference to the axis 31 of the work table, and the leading end 24 of the broach is positioned so that as the work table is turned counterclockwise as seen in FIG. 5, the piston 100 first encounters the leading end 24 of the broach. The piston and the broach are so positioned that they are in parallel planes which are perpendicular to the axis 31, and the planar surface 22 of the broach base 21 moves in a plane parallel to the planar face 10a of the piston 100 and at a distance from said face 10a which is equal to the difference between d and dl. The work table 30 is rotated about the axis 31 so that the series 23 of teeth progressively cuts the groove 14 along the line 14a, and the rotary motion of the work table is continued until the last cutting tooth 26 and the burnishing teeth 27 and 28 of the broach have traversed the entire surface of the piston along the line 14a and formed a complete groove 14. The piston 100 is then remounted upon the work table 30 to successively cut the grooves 15 and 16.

As seen in FIG. 6, a work table 130 is stationary and a tool holder 132 is rotatable clockwise about an axis 131. The operation of cutting a groove is the same as previously described.

As seen in FIG. 7, at each of the three apices of the cylinder are an apex seal 35 and a bolt 36. A terminal portion 15a of the groove 15 and a terminal portion 16a of the groove 16 intersect the faces 13 and 12, respectively, outside the apex seal 35; and a similar condition exists at each of the other apices of the piston. If desired, the groove portions 15a and 16a can be plugged with inserts that are either staked or spot welded in place.

The foregoing detailed description is given for clearness of understanding only and no unnecessary limitations should be understood therefrom, as modifications will be obvious to those skilled in the art.

We claim:

1. A method of providing an essentially planar face of a metal object with a groove which extends between selected margins of said face without intersecting said margins, said groove being uniformly curved on an arc of radius "r" and being of a width "w" and a constant depth "d", said method comprising:

providing a broach which is uniformly curved from a leading end to a trailing end on an arc of radius "r", said broach having a base with a planar surface of width greater than "w", and a series of fixed cutting teeth of width "w" perpendicular to said surface, the teeth of said series being progressively longer from said leading end toward said trailing end and the last tooth in said series being of a length no less than "d";

positioning said article so that its planar face is perpendicular to an axis and the line of the groove to be cut is on an arc of a circle of radius "r" struck about said axis;

positioning said broach so that it occupies an arc of said circle in a plane parallel to said face and with the leading end portion of the planar surface of the broach base confronting said face;

producing relative motion of the object and the broach about said axis with said surface moving in a plane parallel to said face, so as to cause said series of teeth to cut said face of the object progressively;

continuing said motion until all of said teeth have traversed the entire object to form a continuous groove which intersects both of said selected margins;

and plugging the end portions of the groove to effectively obliterate said groove for predetermined distances inwardly from said selected margins.

2. The method of claim 1 in which the broach has a burnishing tooth of length no less than that of the last tooth between said last tooth of the series and the trailing end of the broach, and the relative motion between the object and the broach is continued until said burnishing tooth has traversed the entire object.

3. The method of claim 1 in which the broach is held motionless and the object is moved about the axis.

4. The method of claim 1 in which the object is held motionless and the broach is moved endwise about the axis.

5. The method of claim 1 in which the last tooth in the broach is of a length greater than "d", and the planar surface of the broach base is moved in a plane which is separated from the planar face of the article by a distance which is equal to the amount by which the length of the last tooth exceeds "d".

6. The method of claim 1 in which the object is a piston of an engine of the trochoidal type which has a planar face bounded by arcuate faces, a groove is cut in the planar surface parallel to each of the arcuate faces of the piston so that said grooves intersect adjacent the intersections of said arcuate faces, and portions of said grooves are plugged from said arcuate faces inwardly toward, but not through said intersections.

\* \* \* \* \*